United States Patent [19]

Waters

[11] Patent Number: 4,823,443
[45] Date of Patent: Apr. 25, 1989

[54] STRAP TIE DOWN DEVICE AND METHOD FOR ITS USE

[76] Inventor: Veldon Waters, 5083 Harris Blvd., Ogden, Utah 84403

[21] Appl. No.: 63,326

[22] Filed: Jun. 18, 1987

[51] Int. Cl.$^4$ .............................................. B25B 25/00
[52] U.S. Cl. .................................. 24/68 CD; 24/71.2
[58] Field of Search ............... 24/68 R, 68 CD, 68 A, 24/68 B, 71.2, 71.1; 254/213, DIG. 14

[56] References Cited

U.S. PATENT DOCUMENTS

| | | | |
|---|---|---|---|
| 3,099,055 | 7/1963 | Huber | 24/68 CD X |
| 3,574,342 | 4/1971 | Berns | 24/68 CD X |
| 3,686,715 | 8/1972 | Brodnicki | 24/68 CD |
| 4,154,427 | 5/1979 | Hofarann | 24/68 CD X |
| 4,234,166 | 11/1980 | Cederblad | 24/68 CD |
| 4,372,012 | 2/1980 | Föhl | 24/68 R |
| 4,584,742 | 4/1986 | Speich | 24/68 CD |
| 4,622,721 | 11/1986 | Smetz et al. | 24/68 CD |

FOREIGN PATENT DOCUMENTS 183154. 1/1906 Fed. Rep. of Germany ....... 24/71.2

Primary Examiner—James R. Brittain

[57] ABSTRACT

A strap tie down device combining the winch-pulley effect comprising an elongated rigid frame made up of a base and two spaced parallel side plates attached perpendicular to opposite sides of said base, at both ends of the frame a set of at least two transverse extending connecting rods joined to both sides of the plate members, the connecting rods being separated from each other by sufficient distance to permit a looping of the strap between the rods, the loops are capable of being held in placed by adding a removable rod under the loop, and a winch-type strap tightening apparatus attached to the side plate members between the inner connecting rods at both ends of the frame, and a device for rotating the winch-type strap tightening apparatus so as to tighten any strap placed in the strap adjusting device, and a device for holding the tightening apparatus to prevent unwinding.

6 Claims, 5 Drawing Sheets

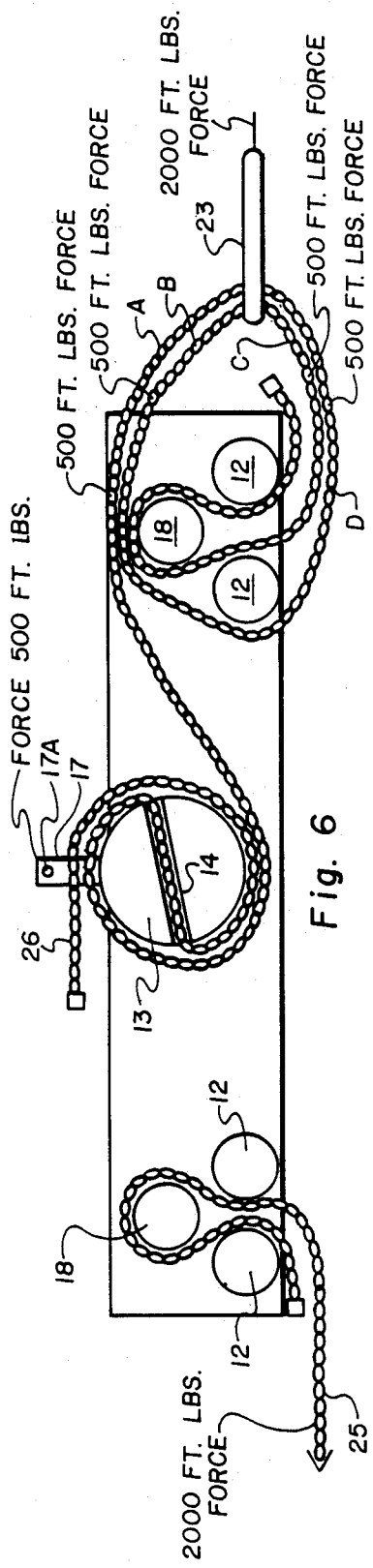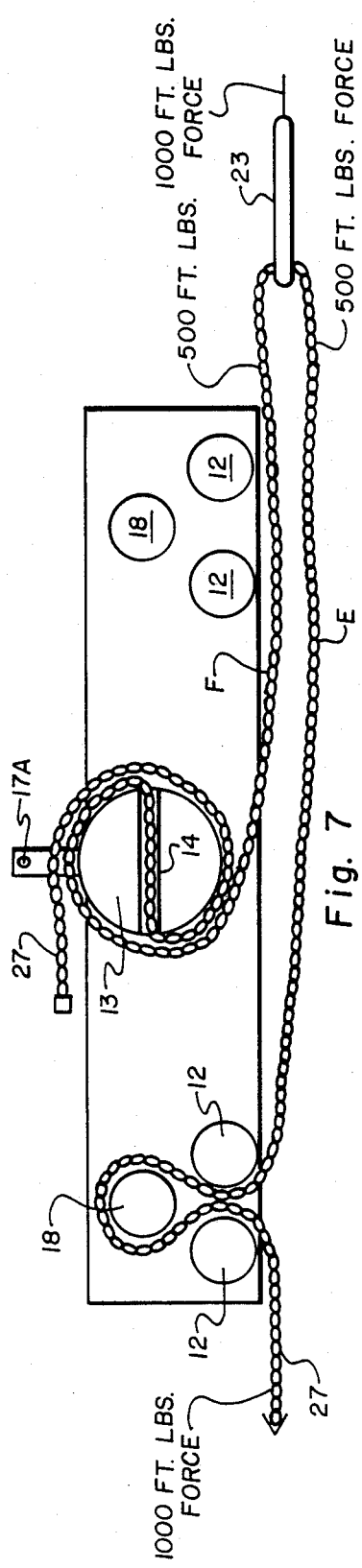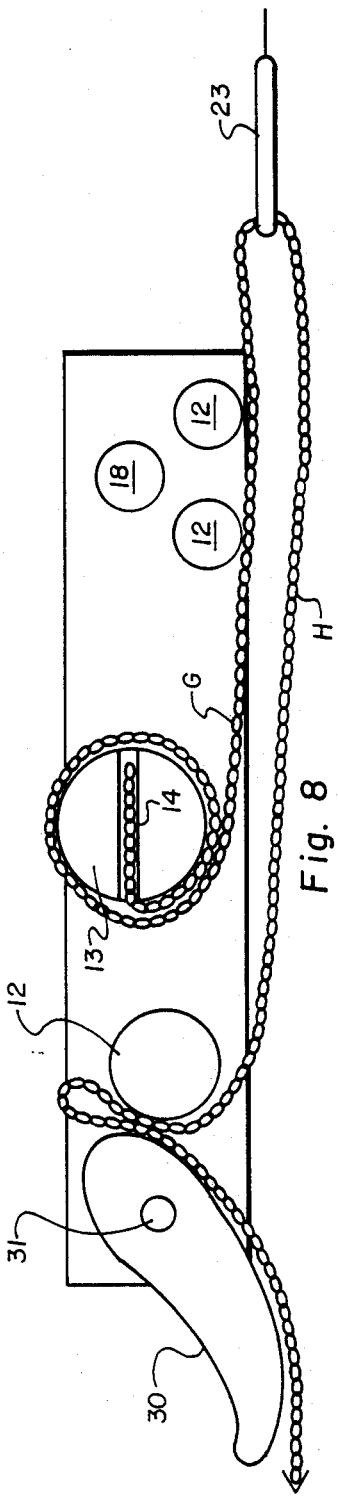

STRAP TIE DOWN DEVICE AND METHOD FOR ITS USE

BACKGROUND OF THE INVENTION

1. Field of the Invention

This invention relates to strap engaging and adjusting devices such as used for securing cargo and the like. More particularly, it relates to a strap tie down device which provides a combined winch-pulley effect and thus permits one to greatly increase the tension force in restraining the cargo.

Specifically, the invention relates to a new and highly efficient strap tie down device combining the winch-pulley effect which provides for the first time ability to apply tension forces of several hundred ft. lbs. in restraining the cargo, and which can be more universally utilized than many prior known devices. The new strap tie down device of the present invention broadly comprises an elongated rigid frame means comprising a base and spaced parallel side plate members attached perpendicular to opposite sides of said base, at both ends of said frame a set of at least two transverse extending connecting rods joined to both sides of said plate member above the base, which connecting rods being separated from each other by sufficient distance to permit a looping of the strap between said rods, which loops capable of being held in place by adding a removable connecting rod under the loop, a winch-type strap tightening means attached to said side plate members above the base and between the most inner connecting rod of both sets, said strap tightening means comprising a rotable shaft means for winding and unwinding the strap, slot means in the shaft means for receiving a portion of the strap, ratchet means associated with the shaft means for releasably holding the shaft means against unwinding rotation during and after the tension of the strap, and mans for permiting rotation of the shaft means to tighten the strap.

The invention further provides methods for using the new strap tie down device as described hereinafter.

2. Prior Art

There is a great variety of material that is now being shipped by trucks, trailers, open freight rail beds, and the like, and there is a great need for devices for securing the loaded objects, such as boxes, pipes, lumber, boats, furniture, etc. on the beds of the trucks, trailers and rail cars to prevent the cargo from shifting and causing damage to the goods and the vehicles involved.

In the past, various devices and apparatus have been suggested for such purpose. Such prior art devices and apparatus have included, for example, such simple devices as ropes or cords or straps and more complicated apparatus including various winch and ratchet mechanisms.

These prior art devices and apparatus, however, have many limitations which have prevented them from being accepted for many tie down applications. Most of such devices, for example, are limited by the amount of tension force that can be applied on the straps and cords, and this often permits the tie downs to loosen after a period of time. Other devices are not too secure and easily slip and loosen the cargo tie. Other devices are complicated and difficult to operate.

Examples of some of the more complicated prior art devices which have various limitations are disclosed and claimed in U.S. Pat. No. 3,826,473, U.S. Pat. No. 4,155,537, U.S. Pat. No. 3,180,623 and U.S. Pat. No. 4,510,652.

Many of such devices which are used on truck beds are either permanently attached or temporarily hooked to the side rail of a flatbed trailer. The permanent winches are seldom in the correct location for securing the load properly. For example, many times the best place for securing the load is over the wheel area where such devices cannot be located. The portable winches rely on the tension in the strap securing the load to keep it hooked on the trailer. If the load shifts or settles, the slack releases the tension in the strap and the portable winch becomes unhooked. Quite often, the portable winch slips off many times while threading the strap through it before it is tight enough to secure the load and keep it hooked down on its narrow side rail edge.

Many of the devices, such as shown in U.S. Pat. No. 3,826,473, require the two ends of the strap to be placed in the wind-up mechanism and this causes the mechanisms to fill twice as fast and in many cases prevents effecting the proper tension.

Other devices, such as shown in U.S. Pat. No. 4,510,652 use a strap tightening device with a plate, and when the strap is tight, the plate is nailed down and the device used on another strap. This type of arrangement presents problems in loosening the strap for unloading as well as possibilities of slipping during movement of the trailer.

It is an object of the invention, therefore, to provide a new type of strap tie down device which avoids many of the above-noted problems. It is a further object to provide a new type of strap tie down device which permits one to greatly increase the tension force to be applied in restraining the cargo. It is a further object to provide a new strap tie down device which can be easily applied to any location on the truck or trailer to restrain the cargo. It is a further object to provide a new strap tie down device which has good security and does not loosen or slip on movement of the cargo. It is a further object to provide a new type of strap tie down device which is easy to operate on any size or type of cargo to be secured. It is a further object to provide a new type of strap tie down device which is economical to make and free of repair. These and other objects of the invention will be apparent from the following detailed description thereof.

SUMMARY OF THE INVENTION

It has now been discovered that these and other objects can be accomplished by the new strap tie down device of the present invention which provides a unique winch-pulley effect which solves many of the above described difficulties associated with the prior known devices.

The new strap tie down device of the present invention broadly comprises an elongated rigid frame means comprising a base and spaced parallel side plate members attached perpendicularly to opposite sides of said base, at both ends of said frame a set of at least two transverse extending connecting rods joined to both sides of said plate members above the base, which connecting rods being separated from each other by sufficient distance to permit a looping of the strap between said rods, which loops capable of being held in placed by adding a removable rod or cam device (FIG. 5) under or against the loops, a winch means attached to said side plate members above the base and between the most inner connecting rods of both sets, said strap tightening means comprising a rotable shaft means for winding and unwinding the strap, slot means in the shaft means for receiving a portion of the strap, ratchet means associated with the shaft means for releasably holding the shaft means against unwinding rotation during and after the tension of the strap, and means for permiting rotation of the shaft means to tighten the strap.

It has been surprisingly found that the above-noted new type of strap tie down device which presents an arrangement which permits both winch and pulley type effect enables one to effect surprisingly high tension force on the restrain of the cargo. For example, tensions forces as high as 20 to 30 thousand ft. lbs. have been obtained by proper use of the new devices. In addition, the new device can be located at any position along the truck or trailer depending on the best location for the tie straps, and is particularly effective over the wheel area. Further advantage is found in the fact that the new device is easy to operate, free of repair problems and can be easily stored when not in use.

BRIEF DESCRIPTION OF THE DRAWINGS

The various objects and features of the present invention will be more fully understood by reference to the accompanying drawings.

FIG. 6 is a schematic drawing of how a strap can be introduced into the tie down device to obtain a tension of 2000 ft. lb. force.

FIG. 7 is a schematic drawing showing how a strap can be introduced into the tie down device to obtain a tension of 1000 ft. lbs. force.

FIG. 8 is a schematic drawing shown the introduction of the strap using the cam as one of the outside connecting rods.

DETAILED DESCRIPTION OF THE PREFERRED EMBODIMENT

Figure 1:
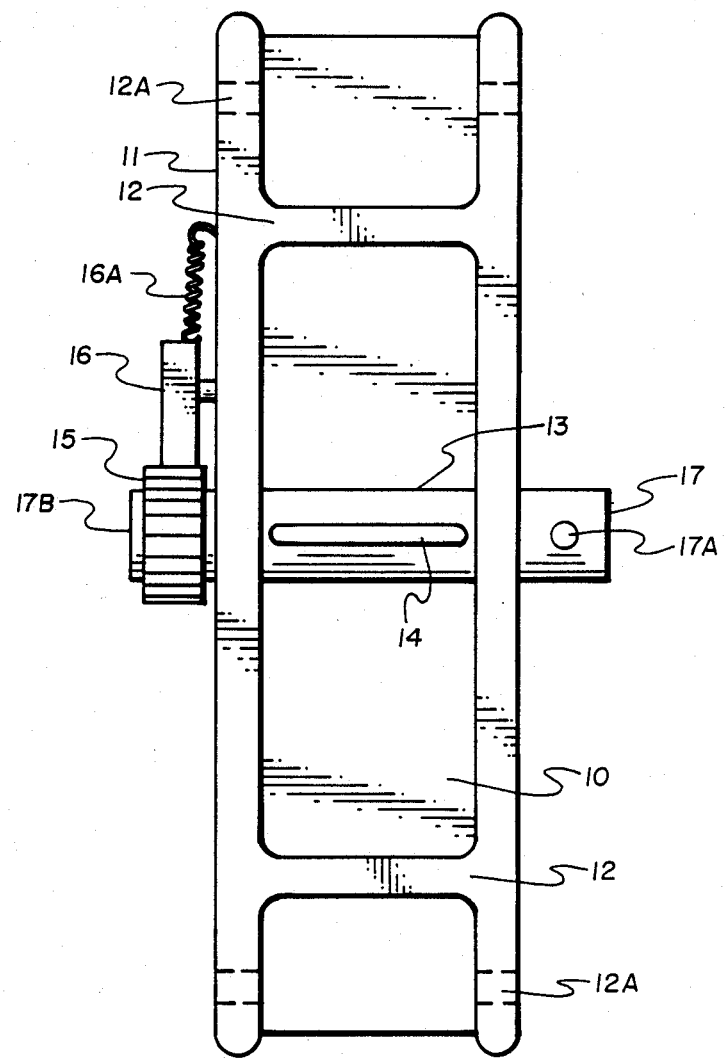
FIG. 1 is a top view of the strap tie down device.

With reference to FIG. 1 which is a top view of the tie down device, the base is shown as 10, the side plate members as 11, two extending connecting rods as 12, the openings in the side plates for insertion of the other connecting rods as 12A, The winch type tightening means as 13 with slot 14 to receive the strap, the ratchet means as 15 with holding means 16, spring means 16A to hold the ratchet engaged when used in other than the vertical position, extension of the shaft 17 with opening 17A as a place for the bar to turn the shaft, and socket means 17B for receiving a ratchet or torque multiplier.

Figure 1A:
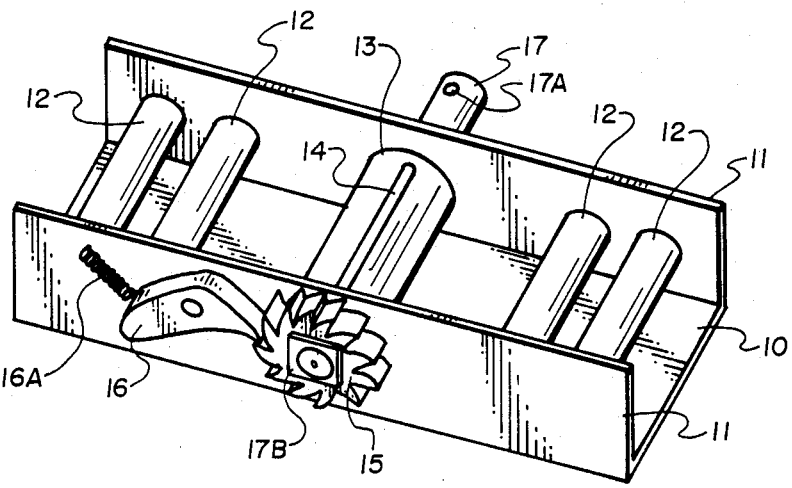
FIG. 1A is a perspective view of the strap tie down device showing the location of the connecting rods and winch assembly.
Figure 1B:
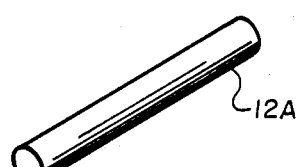
FIG. 1B is a side view of a removable connecting rod.

FIG. 1A is a perspective view of the strap tie down device showing the location of the four connecting rods as well as the winch assembly. The elements shown are as described for FIG. 1.

Figure 2:
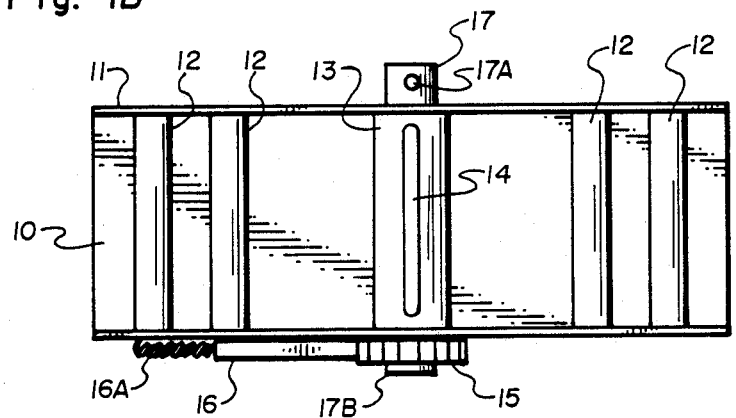
FIG. 2 is a top view of the tie down device showing the presence of the four connecting rods within the device.

FIG. 2 is a top view of the tie down device showing the location of the four connecting rods. The elements shown are as described for FIG. 1.

Figure 3:
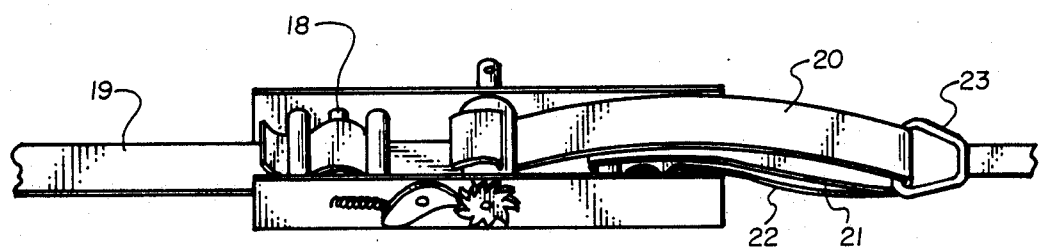
FIG. 3 is a perspective view of the new strap tie down apparatus showing how a strap can be placed in the apparatus.

FIG. 3 is an illustration of how the strap can be applied to the tie down device. As shown in that Figure one end of the strap 19 is looped between two connecting rods at one end of the device, and a removable connecting rod 18 is placed in the loop. Thus, when the strap is pulled tight, the end is held firmly in the device. The other end of the strap 20 is would around the connecting rods at the other end of the device to form loop sections 21 and 22, and around D-ring 23 or other means which in turn is attached to the side of the truck or trailer.

Figure 4:
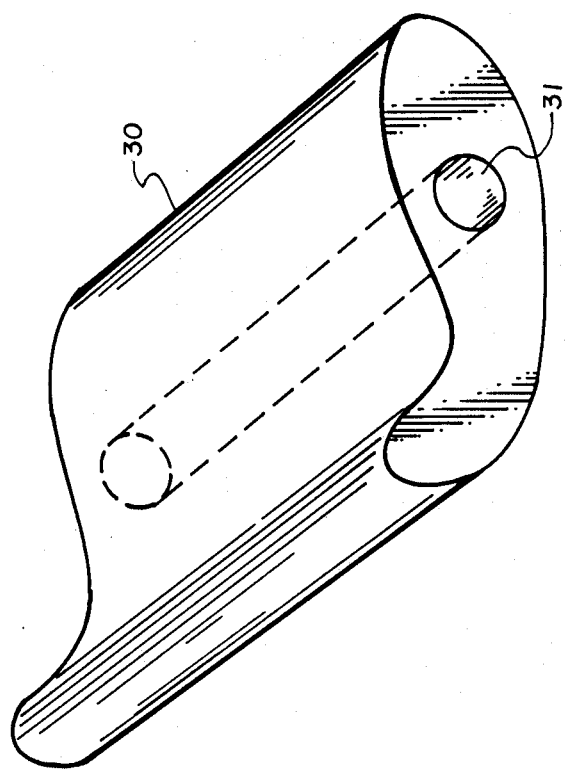
FIG. 4 is a top view of a cam which can be placed in the tie down device.
Figure 4A:
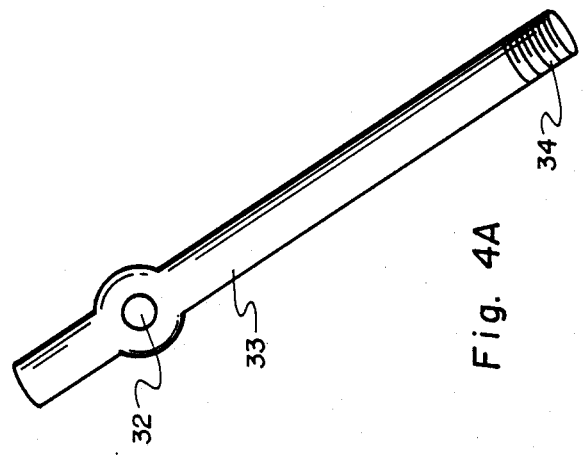
FIG. 4A is a view of a removable pin which can be used to insert the cam in the device.

FIG. 4 is a top view of the cam which can be placed as one of the connecting rods. The cam is illustrated as 30 with the opening 31 for the rod to be inserted in the side of the device at opening 12A shown in FIG. 1. FIG. 4A is a view of the removable pin 33 which can be used to insert the cam in the device. The pin is preferably threaded as 34 with an opening 32 for use in tightening the pin in the device.

Figure 5:
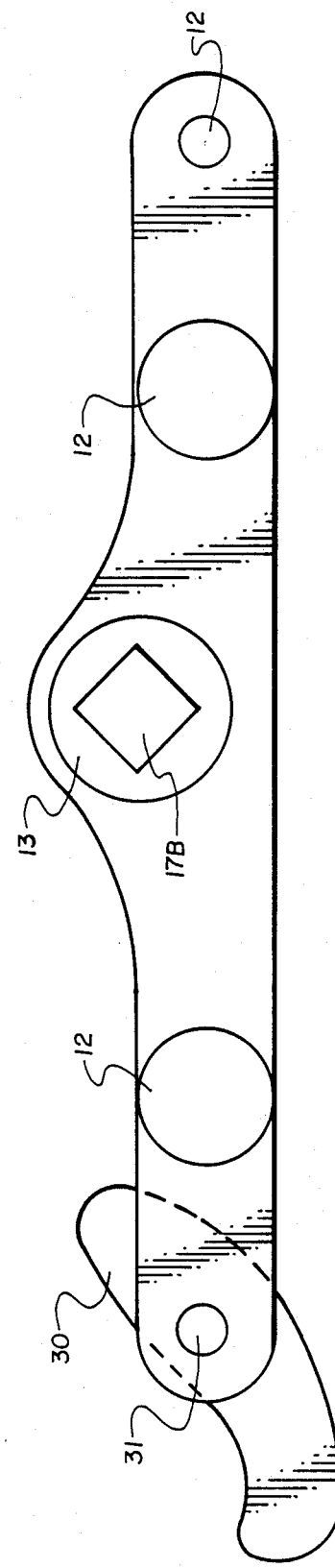
FIG. 5 is a perspective side view of the device showing the location of the cam.

FIG. 5 is a perspective view of the devivce showing the location of the cam 30 as the terminal connecting rod held in place by pin 31. The other elements are as shown in FIG. 1.

FIG. 6 is a schematic drawing showing in illustrative form how the tie down device can be used to produce 2000 ft lb force against retention of the cargo. As shown in that Figure, strap 26 is looped between connecting rods 12 and a removable rod 18 is placed in the loop to retain that end of the strap. The other end of the strap 26 is then looped through D ring 23 and back around the three connecting rods and then through D-ring 23 so as to provide a double strength of strap, and then the strap is then taken around the winch and through slot 14. By applying 500 ft lb force at the turning means 17a, this results in the 500 ft lb force being applied at each of the loops A, B, C and D for a total of 2000 ft lbs at the end of the D ring attached to the trailer. The other strap 25 is looped between the two connecting rods 12 and held in place by removable rod 18. When the strap is pulled tight, the 2000 ft lb force is applied at the end of the device also. It should be noted that some force is lost due to the fraction of the straps, and the preferred straps are made of nylon and quite smooth.

FIG. 7 is a schematic drawing showing in illustrative form how the tie down device can be used to produce 1000 ft lbs force against the retention of the cargo using a single strap. As shown in the Figure, strap 27 is placed in slot 14 thence around the winch device and then through the D ring 23. The strap is then taken through the connecting rods at the other end of the device and looped. Removable connecting rod 18 is then placed in the loop and the strap pulled tight and taken to the other side of the truck or trailer where it could be retain on the side of the vehicle with a hook, D-ring and the like. By applying 500 ft lb force at the turning means 17a, this results in the 500 ft lb force being applied at each of the loops E and F for a total of 1000 ft lbs at the end of the D ring as well as at the other end of the strap.

FIG. 8 is a third schematic drawing showing in illustrative form how the tie down can be used employing a cam as one of the connecting rods to hold the strap in place. The items shown are as in FIG. 7 with the exception that the cam is shown as 30 and the pin to hold the cam as 31.

Figure 9:
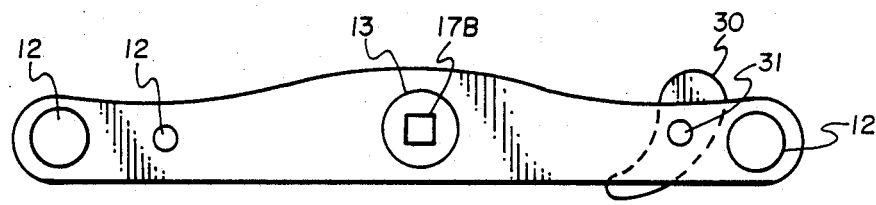
FIG. 9 is a schematic drawing showing the location of the cam on one of the inner connecting rods.

FIG. 9 is a schematic drawing showing the location of the cam as one of the inner connecting rods, with the elements identified as above.

Figure 10:
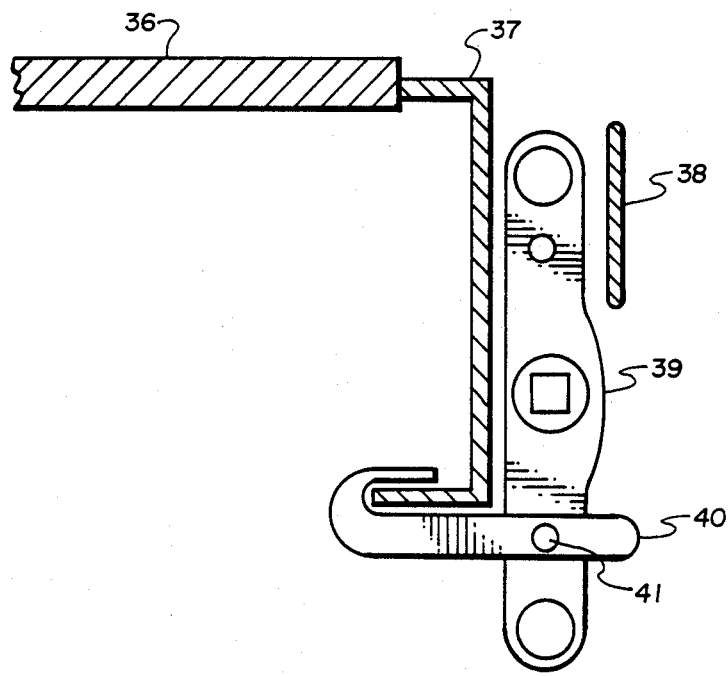
FIG. 10 is an illustration of how the new tie down device can be hooked onto the trailer.

FIG. 10 is an illustration of how the new tie down device can be hooked to the trailer. The bed of the trailer is illustrated as 36, the trailer side frame as 37, the rub rail as 38, the strap tie down device as 39, the metal hook 40 with pin 41 to hold the hook against the tie down device.

Figure 11:
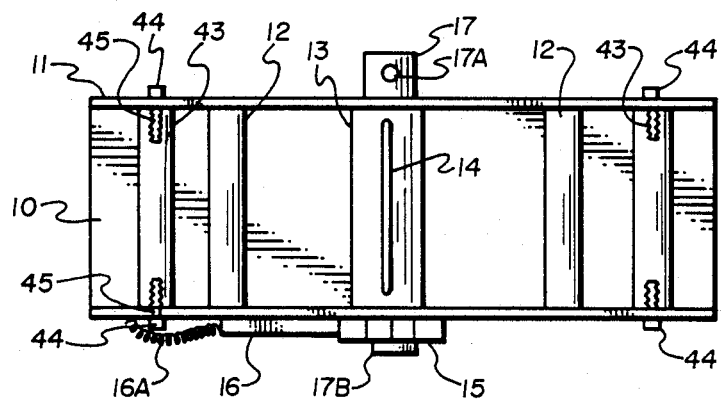
FIG. 11 is a top view of the strap tie down device showing the removable connecting rods.

FIG. 11 is a top view of the tie down device showing the presence of removable connecting rods 43 which are held in place by bolts 44 through openings 45 in the parallel sides.

As noted the strap tie down device of the present invention comprises an elongated rigid frame made up of a base and a pair of spaced parallel elongated side plates attached perpendicularly to opposite sides of the base. The base and side plates can be prepared from any suitable material, such as forged alloy, which may be of any suitable thickness. Preferably the base and side plates are prepared from metal of thickness varying from about ⅛ to about ⅜ inch. The side plates may be attached to the base by any suitable means, such as welding, or the base and side plates could be prepared from a single metal sheet by merely bending up the sides.

The length and width of the rigid frame can vary depending upon the intended use of the device. The base is preferably slightly wider than the strap to be used in the tie down. In general, straps to be used vary from about 1 inch to 4 inches. The side plates should be high enough to permit the operation of the connecting rods as noted above. Preferably, the side plates vary from about 1 to 3 inches in height. The over all length of the device may also vary, but should be generally large enough to accomplish its function, but small enough to permit easy operation and storage. In most cases, the length varies from about 4 to 12 inches.

The connecting rods attached to the sides at each end of the device can vary in number, but preferably are set out in sets of two rods at each end of the device. The rods are spaced apart sufficient distance to permit the strap to be looped and held by the removable rod. The rods themselves may be fixedly attached to the sides or may be removable such as shown in the drawings. In the event the rods are removable, openings are preferably present in the sides so that pins may be introduced to hold the rod inside the device. Preferably at least one of the rods at both ends are fixedly attached to the sides, such as welding, etc. with the other rods being removable. As shown in FIG. 5, the rods can take the form of a cam which is held in place by threaded pin. The cam can be used in any location illustrated in FIG. 5 and in FIG. 9, and any number of cams can be employed.

The rods and cams are preferably prepared from metal and of suitable size to accomplish their purpose in the device. The rods may vary in diameter as desired, but preferably vary from about ⅛ to ⅜ inches.

When the strap is looped and placed between two of the rods as shown in FIG. 3, a rod is placed in the loop to hold the loop secure in the device. Such removable rods can be of any suitable size and length as they maintain the loop between the rods attached to the sides. They preferably have a length equal to the width of the strap being tie down, and a diameter preferably from about ⅛ to ⅜ inches. When a cam is used the cam presses against the loop to hold the loop tight.

The straps to be used in the device can be of any conventional width which preferably varies from about 1 to 4 inches, but larger or smaller ones can be used as desired. The straps can be prepared from any suitable material, but preferably are prepared from webbed or woven nylon material. A single strap can be utilized or several straps can be employed depending upon the system to be used in the tie down.

The method of introducing the straps through the device may vary over a wide range, but in all cases, to take advantage of the superior properties of the new device, the straps should be fed back and forth several times to utilize the pulley effect by increase the tension force per length of strap. The loops of strap preferably vary from about 2 to 10, and more preferably from 2 to 6. The advantages of the use of the loops are shown in FIGS. 6 and 7.

The end of the straps can be tied to the truck or trailer or other vehicle by any conventional means, such as by hooks, D-rings, and the like. Most trailers now have a side-rail running the length of each side of the bed, and the straps are preferably attached to said bar by means of hooks, rings, and the like.

The strap is tightened down by the ratchet means. This type of tightening means can be of any suitable type as long as it permits the tightening of the strap and locking the strap at the proper place. The degree of precision within which tension may be developed will generally be determined by the number of teeth on the ratchet; the greater the number of teeth the more precise the tension adjustments. When desired, the tension applied can be controled by use of a torque multiplying wrench in place of the pull bar as the turning means. The torque multiplying wrench can be one that will permit varying torques to be applied.

The new tie down devices of the present invention can be placed in any location on the truck, trailer, etc. To add additional security, it is sometimes desirable to secure the device to the truck or part of its frame. This is illustrated in FIG. 10 where the deivce is hooked to the trailer side frame by means of a hook means which is bolted to the tie down device.

The new strap tie down devices can be used in a great variety of different ways, particularly those in which one is able to utilize both the winch and pulley effect. As evident, the more loops one is able to make over the connecting rod. such as shown in FIG. 4, the more ft lb force can be applied to the tie down.

The above may be illustrated by a detailed description of the use of the strap as shown in FIG. 6. By applying a force of 500 ft lbs at the turning means, such as by using a 5 ft turning bar with 100 lb pull, or alternatively by using a 2.5 ft turning bar with 200 lb pull, a force of 500 ft lbs is applied at each of the strap sections as shown in that Figure. Thus a force of 500 ft lbs is applied on loop A, a 500 ft lb force at loop B, a 500 ft lb force at loop C and 500 ft lb force at loop D, making a total force of 2000 ft lbs at the D ring 23. That same 2000 ft lbs is also carried on at the other end of the device on strap section 25.

While the invention has been described above in rather detail, it should be understood that many modifications can be made and still accomplish the invention. For example, in applying the force at the turning means, provision can be made to use a torque multiplying wrench to greatly multiply the force to be applied at that point. In addition, modified winch means can be applied, such as by using gear reduction and other means.

The new tie down device of the present invention can be be used in various other application, such as a hoist, winch and as the load binder.

I claim as my invention:

1. A strap adjusting and tension device for securing cargo and the like which utilizes a combined winch-pulley effect permitting one to greatly increase the tension force that can be applied, which device comprises: a rigid frame means comprising a base, a pair of spaced elongated side plate members attached perpendicularly to opposite sides of said base, two sets of two extending connecting rod means joined to both side plate members above and across the said base, with a set of two connecting rod means at each end of said base, a first of said sets having its two extending connecting rod means separated from each other by sufficient distance to permit looping of a strap placed between said connecting rod means of said first set, which loop being capable of being held in place by adding a removable rod means between the side plates under the loop, a winch strap tightening means possessing a slot for insertion of a strap attached between said side plate members above the base and between the two sets of connecting rod means at both ends of the frame, and means for rotating the winch strap tightening means so as to tighten a strap placed in the slot of the winch strap tightening means, and means for holding the winch strap tightening means connected between a side plate member and said winch strap tightening means to prevent unwinding of the strap placed in the slot.

2. A strap adjusing and tension device as in claim 1 wherein the winch strap tightening means comprises a rotable shaft means for winding and unwinding any strap placed in the device, said slot in the rotatable shaft means for receiving a portion of the strap and said means for holding said winch strap tightening means comprising a ratchet means associated with the rotatable shaft means for releasably holding the rotatable shaft means against unwinding rotation during and after the tension has been placed on the strap.

3. A strap adjusting and tension device as in claim 1 wherein one of the two extending connecting rod means of each of said sets is fixedly attached to the side plate members and the other connecting rod means of each said set is removably attached to the side plate members.

4. A strap adjusting and tension device as in claim 1 wherein one of the two extending connecting rod means of each said set is fixedly attached to the side plate members and the other connecting rod means of each said set is removably attached to the side plate members by means of bolt means placed through openings on both sides of said plate members.

5. A strap adjusting and tension device as in claim 1 wherein one of the extending connecting rod means of said second set is a cam device.

6. A strap adjusting and tension device as in claim 1 wherein one of the extending connecting rod means of said second set is a cam device held in place by bolt means threaded into one of the side plate members.

* * * * *